Jan. 23, 1951 R. A. MURRAY 2,539,199
MACHINE FOR CUTTING VINES
Filed Jan. 23, 1948 3 Sheets-Sheet 1

Inventor
ROBERT A. MURRAY
By Whittemore, Hulbert & Belknap
Attorneys

Inventor
ROBERT A. MURRAY
By Whittemore, Hulbert & Belknap
Attorneys

Patented Jan. 23, 1951

2,539,199

UNITED STATES PATENT OFFICE 2,539,199

MACHINE FOR CUTTING VINES

Robert A. Murray, Vineland, N. J.

Application January 23, 1948, Serial No. 4,027

1 Claim. (Cl. 56—244)

The present invention relates to a machine for cutting vines and more particularly to a novel knife carrier and mechanism for driving the carrier. Specifically, the invention is directed to cutting mechanism designed to sever sweet potato vines which lie flat on the ground.

In the development and cultivation of sweet potatoes the plants are arranged in rows and are spaced from each other at regularly spaced intervals. As the vines grow they are combed in such a way that all of them lie horizontally on the ground with the vines and branches extending in the direction of the row and in substantially parallel relation. Before the sweet potatoes are dug from the ground it is necessary that the covering of vines be cut and removed.

It is the principal object of this invention to provide a cutting mechanism which is particularly suitable for severing vines lying horizontally while the mechanism is being drawn thereover by a tractor or the like.

It is another object of the invention to provide driving means for the cutter with suitable mechanism for connecting it to a power take-off of the conventional tractor.

It is a further object of the invention to provide a support for the cutter with appropriate height adjustment means thereon whereby the depth of cut may be gauged.

Other objects will be apparent from the following description of the invention taken in connection with the accompanying drawings, in which Fig. 1 is a rear elevation of a preferred embodiment of the invention illustrating the knife carrier and mounting means therefor;

Figure 1:
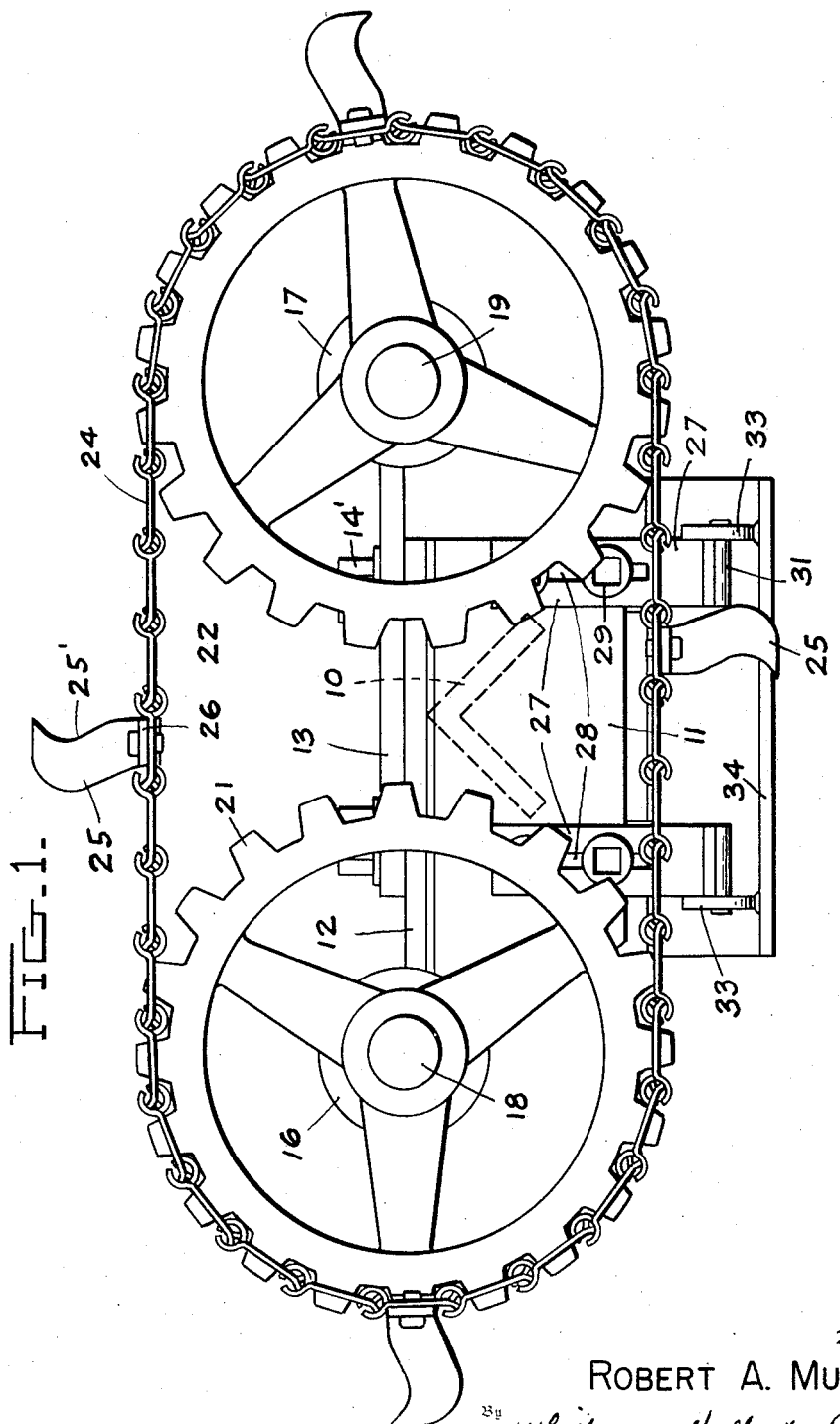
Figure 2:
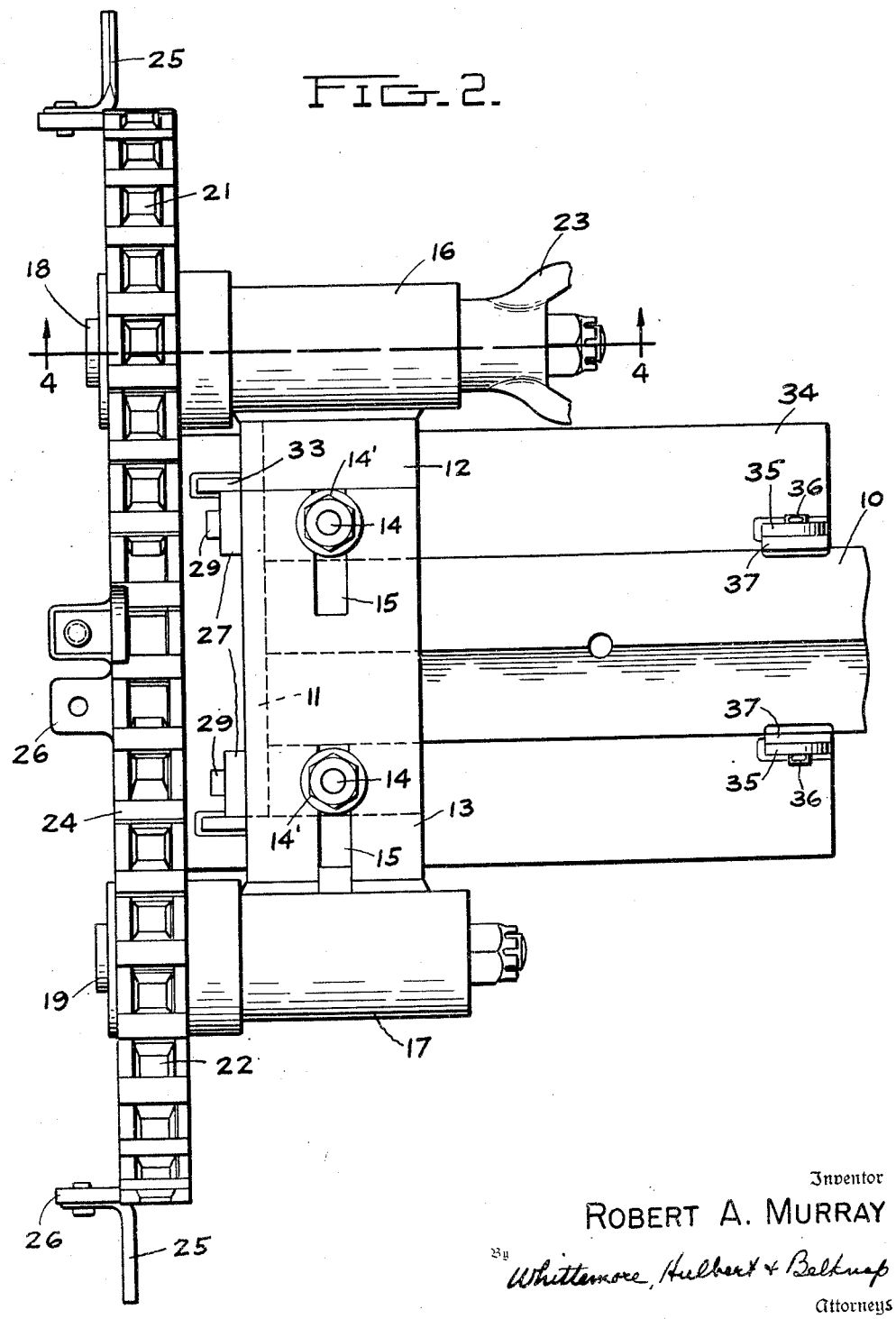
Fig. 2 is a top plan view of the mechanism shown in Fig. 1.
Figure 3:
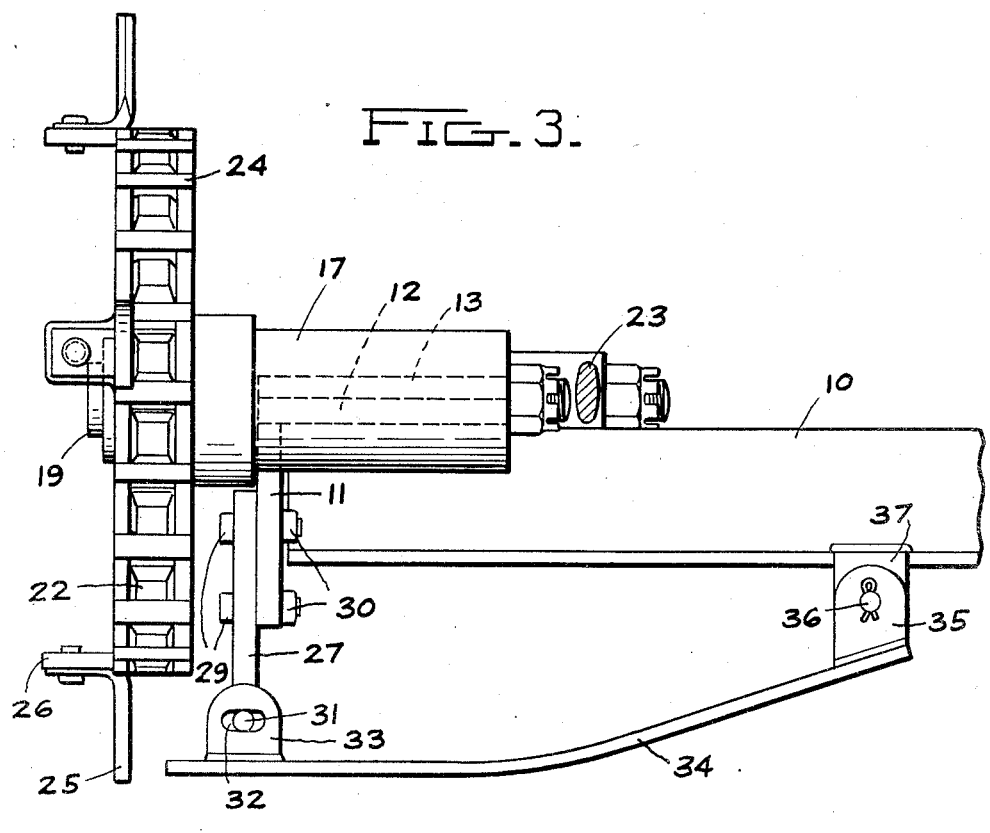
Fig. 3 is a side view of the mechanism.
Figure 4:
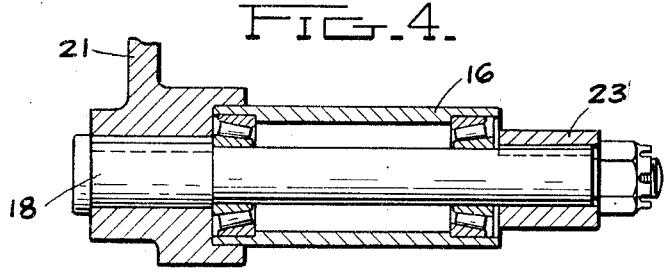
Fig. 4 is a section taken on line 4—4 of Fig. 2.

In the drawings, it will be seen that the main supporting frame consists of an angle iron draft bar 10 to which are welded vertical plate 11 and horizontal plate 12. The draft bar is provided with suitable means for attaching an end thereof to the tool bar of a tractor to permit vertical swinging movement of the draft bar. A second horizontal plate 13 is secured to plate 12 by bolts 14 passing through both horizontal plates, and nuts 14' cooperating with the bolts. Plate 13 is provided with elongated slots 15 to permit adjustment of this plate with respect to plate 12. Welded to the ends of plates 12, 13 are bearing housings 16, 17 adapted to accommodate sprocket shafts 18, 19, to which are keyed sprockets 21, 22, respectively. Shaft 18 is a driven shaft having a universal joint 23 thereon for connection to a drive shaft (not shown) leading from the tractor take-off. Shaft 19 is an idle shaft. Knife-carrying chain 24 passes around the sprockets and carries one or more knives 25 fastened to angle links 26, the latter forming part of the chain 24. It is to be noted that the cutting edge 25' of the knives is in a vertical plane and is curved to form a hook. Adjustment of the distance between the sprocket shafts can be made to take up slack in the carrier chain by moving plate 13 with respect to plate 12.

Adjustably secured to plate 11 are a pair of arms 27 having elongated slots 28 therein. Connection between the plate and arms is made by means of bolts 29 having nuts 30 thereon which may be loosened to permit vertical adjustment of the arms. A pin 31 on each arm cooperates with an elongated opening 32 in each of ears 33, the latter being welded to or formed on a runner having substantial width indicated at 34. The runner has another pair of ears 35 at its other end pivotally connected by means of pins 36 to depending ears 37 on draft bar 10. It will thus be seen that the runner is capable of vertical adjustment with respect to the shafts of the knife carrier. The runner engages the ground during the cutting operation and supports the knife carrier. Hence it is obvious that the depth of the cut made by the knife may be varied by vertical adjustment of the runner.

In use, the cutting apparatus is drawn by a tractor or the like in the direction of the vines and the runner holds the parallel vines against the ground in a horizontal position. While the vines are so held, the knives are drawn transversely across them, whereupon the vines are severed near the points where they emerge from the ground. They are later gathered to permit ready digging of the sweet potatoes which form the roots of the vines.

While a preferred form of the mechanism has been described and illustrated, it is to be understood that modifications thereof are contemplated within the definition of the invention as set forth in the claim.

Having described my invention, what I claim as new and desire to secure by Letters Patent is:

Apparatus for cutting potato vines and the like, including a frame adapted for connection to a mobile vehicle, a longitudinally extending shoe having substantial width operatively connected to said frame, the rear edge of said shoe being substantially horizontally disposed and extending transversely thereof, a knife blade movable in a plane adjacent to and parallel with said edge of said shoe, said blade being in intersecting relation to the horizontal plane of said shoe, and means for moving said knife in said plane, said shoe being adapted to be drawn over the vines to hold the vines against the ground in substantially perpendicular relation to said rear edge, said blade engaging and cutting the vines while the vines are so held down by said shoe.

ROBERT A. MURRAY.

REFERENCES CITED

The following references are of record in the file of this patent:

UNITED STATES PATENTS

| Number | Name | Date |
|---|---|---|
| 1,079,671 | Simmons | Nov. 25, 1913 |
| 1,107,603 | Gardner | Aug. 18, 1914 |
| 1,254,999 | Felker et al. | Jan. 29, 1918 |
| 1,509,786 | Simon | Sept. 23, 1924 |
| 2,139,802 | Catchpole | Dec. 13, 1938 |
| 2,141,806 | Zielesch | Dec. 27, 1938 |
| 2,337,307 | Beck | Dec. 21, 1943 |